US007503673B2

(12) United States Patent
Chou

(10) Patent No.: US 7,503,673 B2
(45) Date of Patent: Mar. 17, 2009

(54) LED LIGHT SOURCE MODULE IN TUBE

(75) Inventor: Hsien-Chung Chou, Chung-Ho (TW)

(73) Assignee: Beauty Up Co., Ltd., Chung-Ho, Taipei County (TW)

( * ) Notice: Subject to any disclaimer, the term of this patent is extended or adjusted under 35 U.S.C. 154(b) by 227 days.

(21) Appl. No.: 11/504,011

(22) Filed: Aug. 15, 2006

(65) Prior Publication Data

US 2007/0241653 A1 Oct. 18, 2007

(30) Foreign Application Priority Data

Apr. 14, 2006 (TW) .............................. 95206318 U

(51) Int. Cl.
*F21V 1/00* (2006.01)

(52) U.S. Cl. ........................ 362/240; 362/223; 362/612

(58) Field of Classification Search ................. 362/147, 362/606, 612, 613, 240, 223
See application file for complete search history.

(56) References Cited

U.S. PATENT DOCUMENTS 5,526,244 A * 6/1996 Bishop ....................... 362/147
6,283,612 B1 * 9/2001 Hunter ....................... 362/240
6,840,646 B2 * 1/2005 Cornelissen et al. ........ 362/606
7,374,327 B2 * 5/2008 Schexnaider ................ 362/613
2008/0037280 A1 * 2/2008 Sheng ........................ 362/612

* cited by examiner

*Primary Examiner*—Sandra O'Shea
*Assistant Examiner*—James W Cranson
(74) *Attorney, Agent, or Firm*—Roger H. Chu; Bond-Yen Ting

(57) ABSTRACT

A light source module including: at least one lighting seat bodies equipped with light-emitting diodes, the light-emitting diodes being connected with a lighting circuit, whereby after the lighting circuit is closed, the light-emitting diodes are driven and lighted; and a light guide medium, at least one face of the light guide medium being defined as an incident face right facing light-projecting faces of the light-emitting diodes. A back face of the light guide medium is printed with multiple reflective sections. The light coming into the light guide medium is reflected by the reflective sections to a front face of the light guide medium and goes out from the front face.

10 Claims, 7 Drawing Sheets

100
30
10
12
121a
121b
21
22
14
13
23
20
22
40
21
13
14
11
11
10
121a
12
121b 100
10
12
121a
121b
31
30
22
21
14
13
23
20
40
11

LED LIGHT SOURCE MODULE IN TUBE

BACKGROUND OF THE INVENTION

1. Field of the Invention

The present invention is related to a light source module in which light-emitting diodes are arranged at one end or both ends of a light guide medium. A back face of the light guide medium is printed with multiple reflective sections. After the light-emitting diodes are lighted, the light emitted from the light-emitting diodes comes into the light guide medium. The light partially goes to the back face with the reflective sections and is reflected by the reflective sections to a front face of the light guide medium to go out from the front face.

2. Description of the Prior Art

The existent daily used light sources such as fluorescent lamps consume a lot of power. It is a trend to save energy so that various more power-saving light source modules have been developed. In the current electronic elements, light-emitting diodes are relatively energy-saving light sources. Accordingly, some manufacturers have applied light-emitting diodes to light source modules to serve as general illuminators.

FIG. 7 shows a conventional light source module composed multiple light-emitting diodes. The light source module includes an elongated circuit board 61 in which multiple light-emitting diodes 62 are inlaid. The circuit board 61 is fitted through a tubular body 63. Two lamp tube connectors 64 are respectively fitted in two ends of the tubular body 63 to have a specification as a fluorescent lamp. However, such light source module has some shortcomings in manufacturing and application as follows:

1. In manufacturing, the circuit board 61 must have a length equal to that of the lamp tube. Therefore, the manufacturing cost is increased. In addition, the elongated circuit board 61 must be fitted into the tubular body 63. Therefore, it is troublesome and time-consuming to manufacture the light source module.

2. It is necessary to inlay many light-emitting diodes 62 on the circuit board 61 at equal intervals. A great number of light-emitting diodes 62 are used. This increases the manufacturing cost.

3. The manufacturer must produce different circuit boards with different lengths according to the lengths of different lamp tubes. It is quite troublesome and inconvenient to produce the circuit boards and manage the materials.

SUMMARY OF THE INVENTION

It is therefore a primary object of the present invention to provide a light source module including: at least one lighting seat bodies equipped with light-emitting diodes, the light-emitting diodes being connected with a lighting circuit, whereby after the lighting circuit is closed, the light-emitting diodes are driven and lighted; and a light guide medium, at least one face of the light guide medium being defined as an incident face right facing light-projecting faces of the light-emitting diodes. A back face of the light guide medium is printed with multiple reflective sections. The light coming into the light guide medium is reflected by the reflective sections to a front face of the light guide medium and goes out from the front face.

It is a further object of the present invention to provide the above light source module which includes two lighting seat bodies tightly fitted on two opposite ends of the light guide medium. Each lighting circuit has a pair of electrodes protruding from the lighting circuit with a specification of a common fluorescent lamp. An outer cover is fitted around the light guide medium, whereby the light source module can be used instead of a common lamp tube.

It is still a further object of the present invention to provide the above light source module which further includes a reflective shade attached to all faces of the light guide medium except the front face and the incident face. The light going out from the other faces of the light guide medium is reflected by the reflective shade and concentrated to go out from the front face of the light guide medium. Therefore, the brightness of the front face of the light guide medium is enhanced.

The present invention can be best understood through the following description and accompanying drawings wherein:

DETAILED DESCRIPTION OF THE PREFERRED EMBODIMENTS

Figure 1:
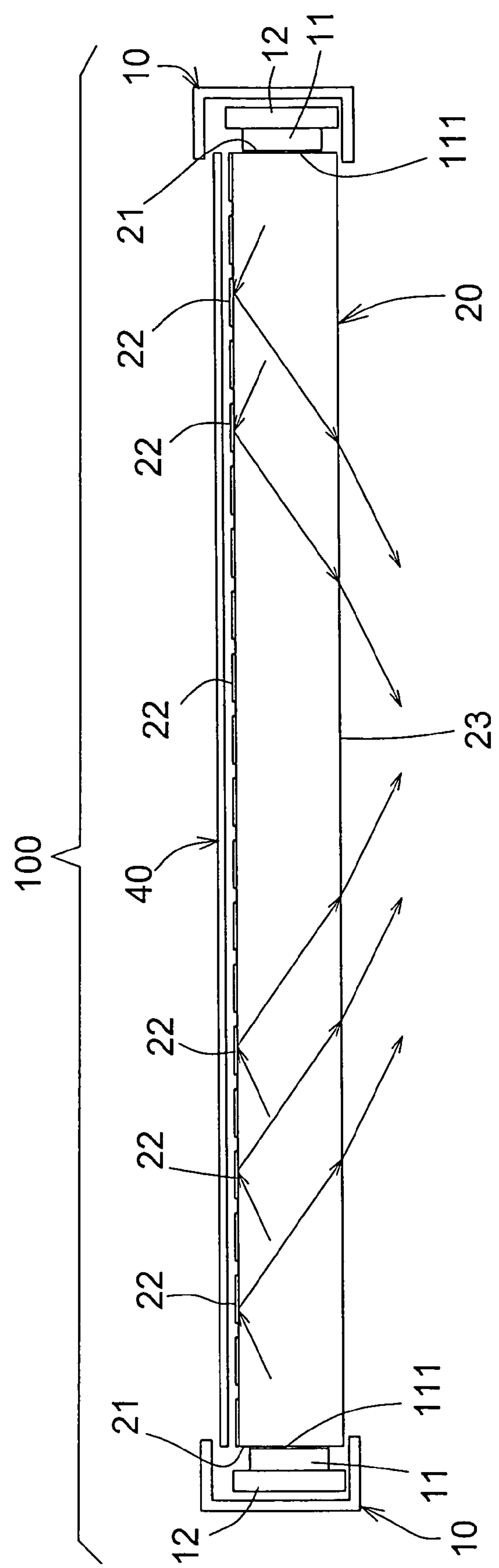
FIG. 1 is a side view of the present invention, showing the structure thereof.

Please refer to FIGS. 1 to 6. The light source module 100 of the present invention includes two lighting seat bodies 10 equipped with light-emitting diodes (LED) 11. The light-emitting diodes 11 are connected with a lighting circuit 12. After the lighting circuit 12 is closed, the light-emitting diodes 11 are driven and lighted. The light source module 100 further includes a light guide medium 20. At least one face of the light guide medium 20 is defined as an incident face 21 right facing the light-projecting faces 111 of the light-emitting diodes 11. A back face of the light guide medium 20 is printed with ink to form multiple reflective sections 22. The light coming into the light guide medium 20 and going to the reflective sections 22 (as shown by the arrows of FIG. 1) is reflected by the reflective sections 22 to a front face 23 of the light guide medium 20 and goes out from the front face 23.

The light guide medium 20 of the light source module 100 of the present invention is made from a transparent material such as glass, acryl, etc. The light guide medium 20 can be a bar body or a circular rod.

Figure 2:
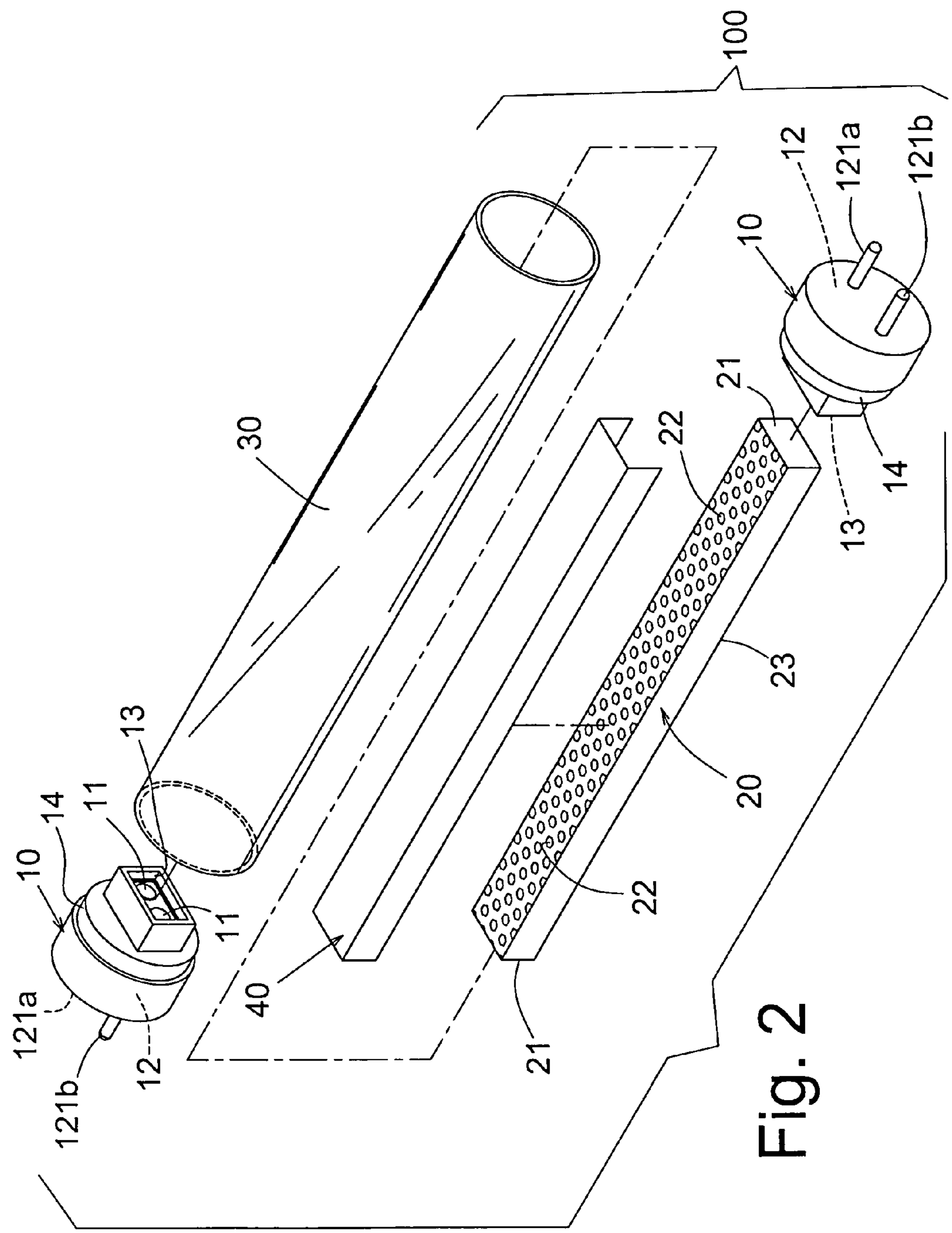
FIG. 2 is a perspective exploded view of a first embodiment of the present invention as a fluorescent lamp.
Figure 3:
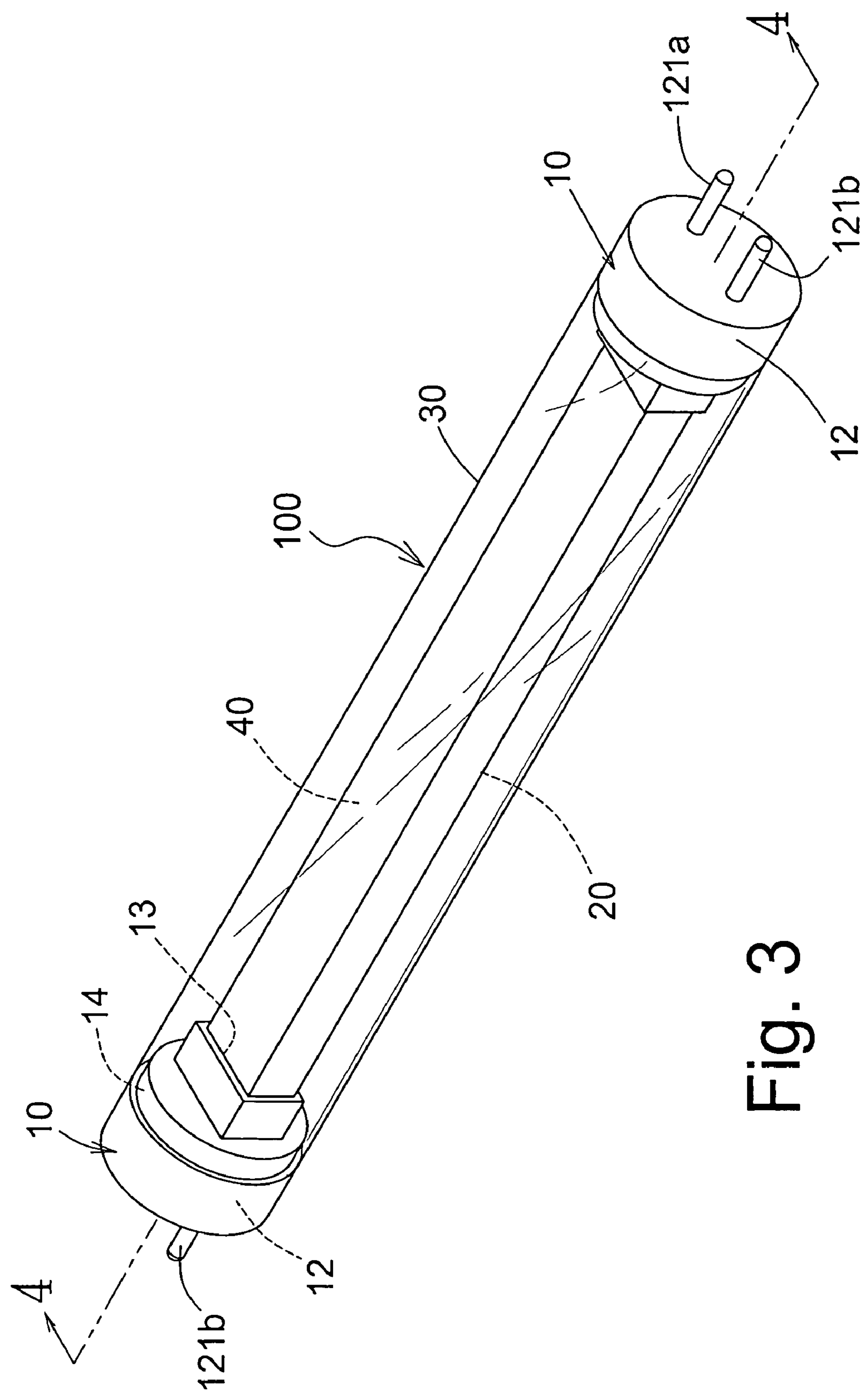
FIG. 3 is a perspective assembled view of the present invention.
Figure 4:
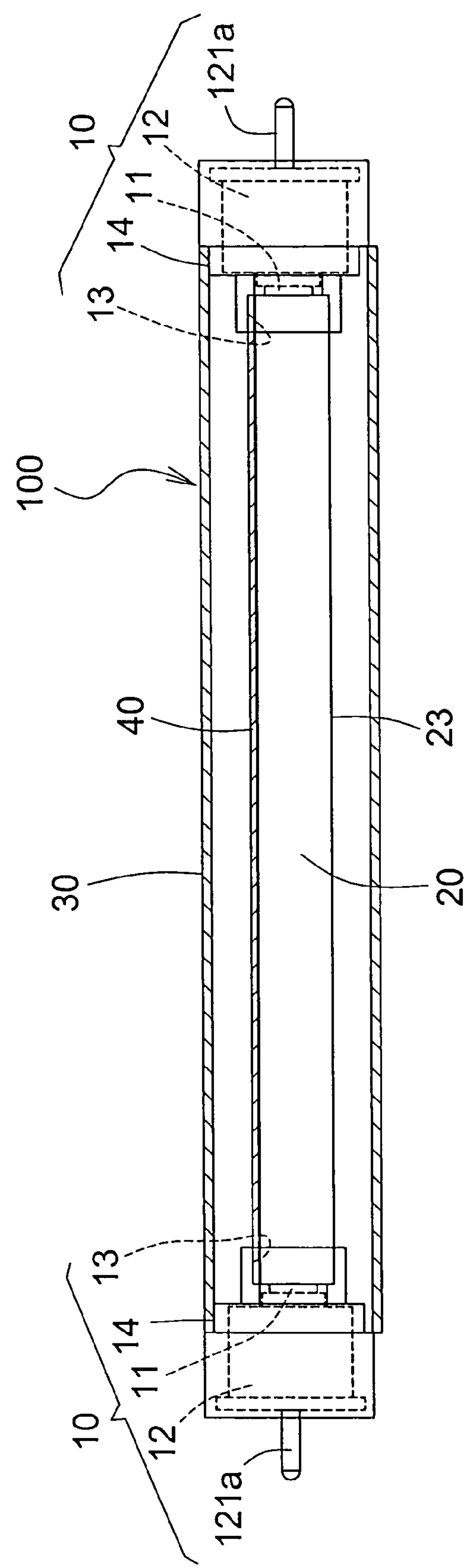
FIG. 4 is a partially sectional view taken along line 4-4 of FIG. 3.
Figure 5:
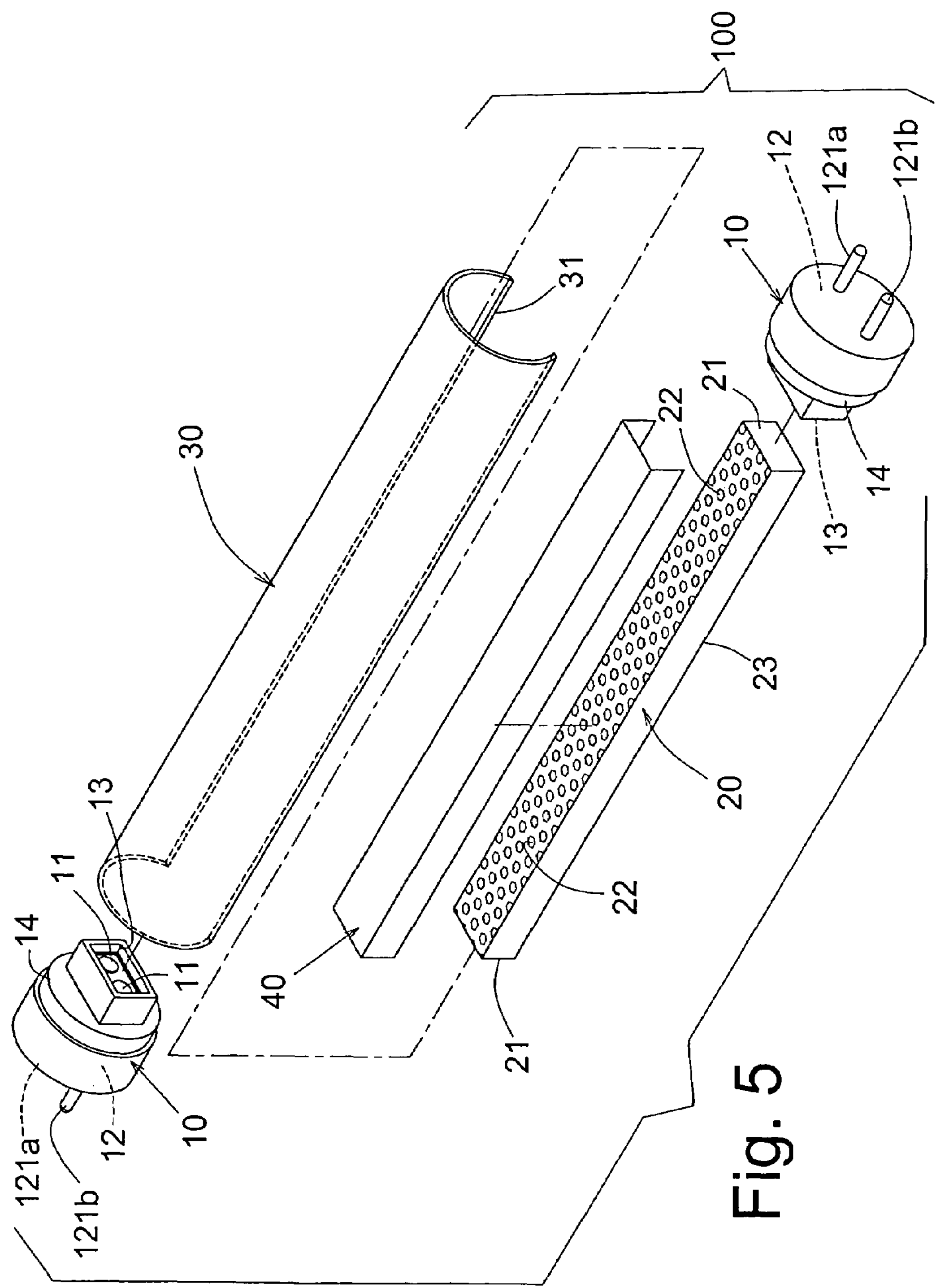
FIG. 5 is a perspective exploded view of a second embodiment of the present invention.
Figure 6:
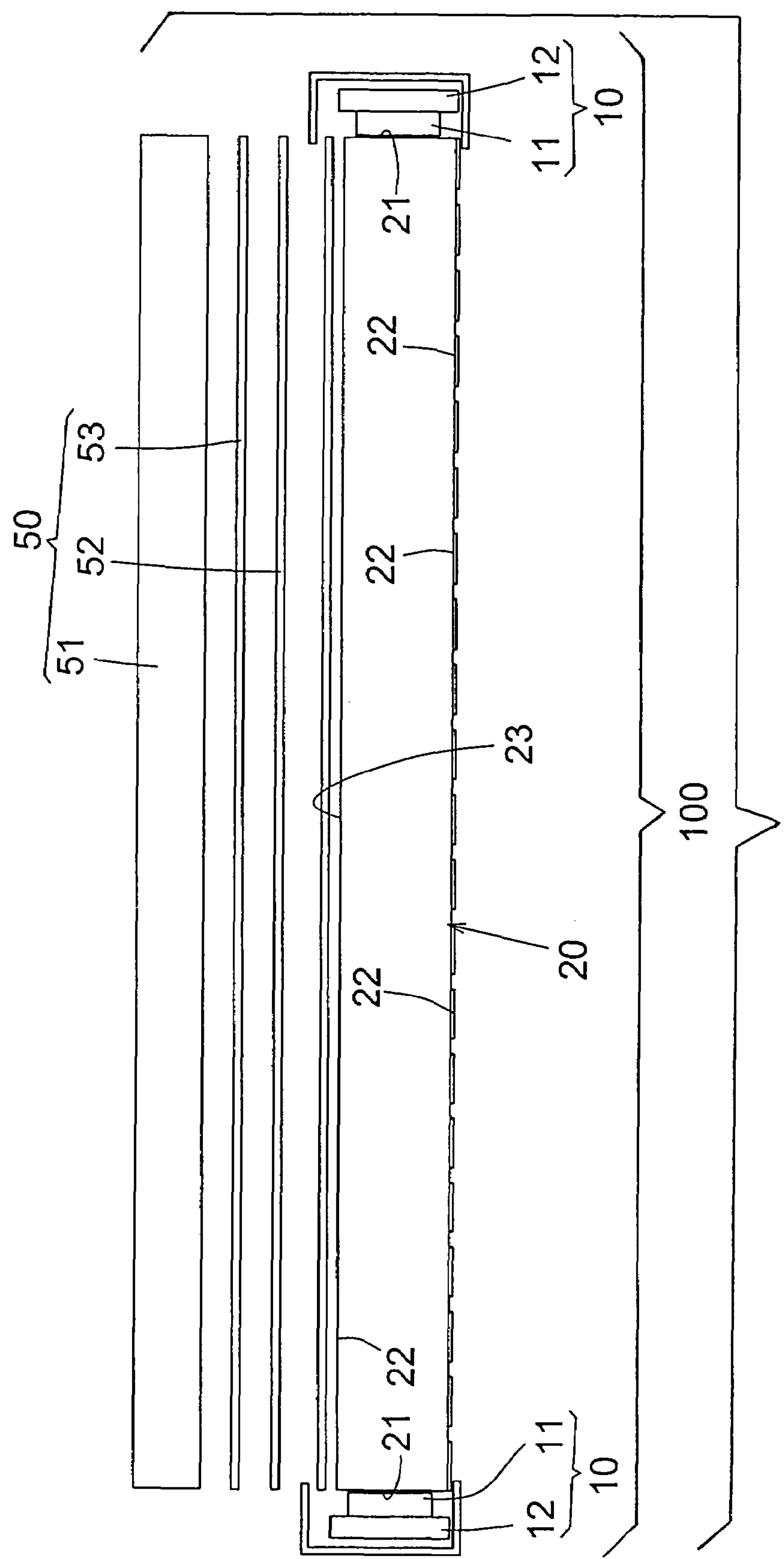
FIG. 6 is a side view showing that the present invention is applied to a display as a backlight module.
Figure 7:
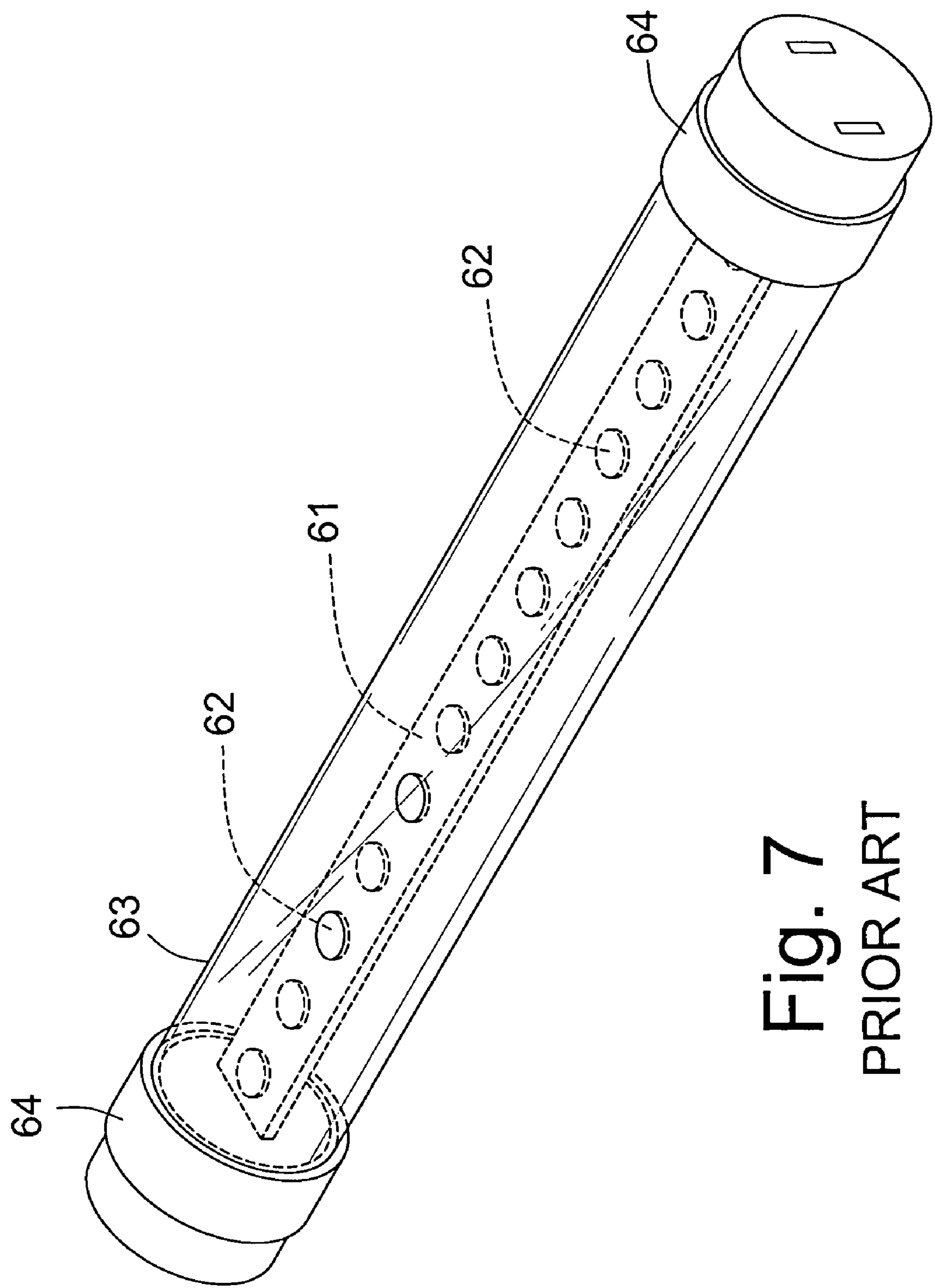
FIG. 7 is a perspective view of a conventional light source module.

Referring to FIGS. 2 to 4, the light source module 100 of the present invention includes two lighting seat bodies 10 tightly fitted on two opposite ends of the light guide medium 20. The lighting circuit 12 is arranged in the lighting seat body 10. Each lighting circuit 12 has a pair of electrodes 121*a*, 121*b* protruding from the lighting circuit 12 with a specification of a common fluorescent lamp. An outer cover 30 is fitted between the two lighting seat bodies 10 to enclose the light guide medium 20. The outer cover 30 can be a transparent circular tube, whereby the light source module 100 will have an appearance as that of a common fluorescent lamp and can be used instead of the fluorescent lamp. Alternatively, as shown in FIG. 5, the outer cover 30 is a tubular body with C-shaped cross-section. The outer cover 30 has a longitudinal split 31 corresponding to the front face 23 of the light guide medium 20. Accordingly, the light beam can go from the front face 23 directly to outer side. Referring to FIGS. 2 and 4, one end of the lighting seat body 10 is formed with a socket 13 in which one end of the light guide medium 20 is inserted. In addition, a fitting section 14 is formed on outer circumference of the lighting seat body 10. Two ends of the outer cover 30 are fitted on the fitting sections 14 of the lighting seat bodies 10.

Referring to FIGS. 1 and 2, the light source module 100 further includes a reflective shade 40 made from reflective materials such as aluminum. The reflective shade 40 is attached to all faces of the light guide medium 20 except the front face 23 and the incident face 21. Accordingly, the light going out from the other faces of the light guide medium 20 is reflected by the reflective shade 40 and concentrated to go out from the front face 23 of the light guide medium 20. Therefore, the brightness of the front face 23 of the light guide medium 20 is enhanced.

The light source module 100 can be used as a common lamp tube. Alternatively, the front face 23 of the light guide medium 20 can be aligned with and face a glass layer (CCFT) 51 of a display 50. A scattering plate 52 and a brightening plate 53 are disposed between the light guide medium 20 and the glass layer 51. Accordingly, the light source module 100 can serve as a backlight module of the display 50.

The light source module 100 of the present invention is characterized in that the light-emitting diodes 11 are arranged at one end or both ends of the light guide medium 20. The back face of the light guide medium 20 is printed to form multiple reflective sections 22. After the light emitted from the light-emitting diodes 11 comes into the light guide medium 20, the light partially goes to the reflective sections 22 and is reflected by the reflective sections 22 to the front face 23 and goes out from the front face 23. The light is also reflected by the reflective shade 40 and concentrated to go out from the front face 23 of the light guide medium 20.

According to the above arrangements, the present invention has the following advantages:

1. The light-emitting diodes 11 serve as the light sources so that the power is saved.

2. The light-emitting diodes 11 are arranged at both ends of the light guide medium 20. By means of the light guide medium 20, the light is projected through an elongated range. Therefore, it is unnecessary to inlay multiple light-emitting diodes on the elongated circuit board for projecting the light to the distal end. It is quite convenient and quick to manufacture the light source module of the present invention. In addition, the manufacturing cost is lowered.

3. The light source module of the present invention can be used instead of a common lamp tube. Also, the light source module 100 can serve as a backlight module of a display.

The above embodiments are only used to illustrate the present invention, not intended to limit the scope thereof. Many modifications of the above embodiments can be made without departing from the spirit of the present invention.

What is claimed is:

1. A light source module comprising:(a) two lighting seat bodies each equipped with light-emitting diode, the light-emitting diode being connected with a lighting circuit; and (b) a light guide medium, at least one face of the light guide medium being defined as an incident face right facing light-projecting faces of the light-emitting diode, a back face of the light guide medium being printed with ink to form multiple reflective sections, whereby the light coming into the light guide medium and going to the reflective sections is reflected by the reflective sections to a front face of the light guide medium and goes out from the front face, and wherein the lighting circuit, arranged in each of the two lighting seat bodies, includes a pair of electrodes protruding from the lighting circuit with a specification of a common fluorescent lamp.

2. The light source module as claimed in claim 1, further comprising a reflective shade attached to all faces of the light guide medium except the front face and the incident face.

3. The light source module as claimed in claim 1, wherein the two lighting seat bodies tightly fitted on two opposite ends of the light guide medium.

4. The light source module as claimed in claim 3, wherein an outer cover is fitted between the two lighting seat bodies to enclose the light guide medium, the outer cover being a transparent circular tube.

5. The light source module as claimed in claim 1, wherein one end of said each of the two lighting seat bodies is formed with a socket in which one end of the light guide medium is inserted.

6. The light source module as claimed in claim 1, wherein a fitting section is formed on outer circumference of said each of the two lighting seat bodies, two ends of a transparent outer cover being fitted on the corresponding fitting sections of said each of the two lighting seal bodies to enclose the light guide medium.

7. The light source module as claimed in claim 1, wherein the front face of the light guide medium is aligned with and faces a glass layer of a display.

8. A light source module comprising:(a) two lighting seat bodies each equipped with a light-emitting diode, the light-emitting diode being connected with a lighting circuit; and (b) a light guide medium, at least one face of the light guide medium being defined as an incident face right facing light-projecting faces of the light-emitting diode, a back face of the light guide medium being printed with ink to form multiple reflective sections, whereby the light coming into the light guide medium and going to the reflective sections is reflected by the reflective sections to a front face of the light guide medium and goes out from the front face, and wherein an outer cover is fitted between the two lighting seat bodies to enclose the light guide medium, the outer cover being a tubular body with C-shaped cross-section, the outer cover having a longitudinal split corresponding to the front face of the light guide medium.

9. The light source module as claimed in claim 8, wherein the two lighting seat bodies tightly fitted on two opposite ends of the light guide medium.

10. The light source module as claimed in claim 8, wherein one end of each of the two lighting seat bodies is formed with a socket in which one end of the light guide medium is inserted.

* * * * *